3,341,617
PROCESS FOR THE PRODUCTION OF LOW-MO-LECULAR WEIGHT LIQUID BUTADIENE/DI-OLEFIN COPOLYMERS WITH A HIGH CONTENT OF CENTRALLY POSITIONED DOUBLE BONDS

Bernhard Schleimer and Heinrich Weber, Marl, Germany, assignors to Chemische Werke Hüls A.G., Marl, Germany
No Drawing. Filed Mar. 11, 1966, Ser. No. 533,437
Claims priority, application Germany, Mar. 12, 1965,
C 35,293
10 Claims. (Cl. 260—680)

This invention relates in general to a method of producing low-molecular weight liquid unsaturated polymers, and in a more narrow sense, to a method of copolymerizing butadiene with conjugated diolefins. In one aspect, the invention relates to a method of regulating and controlling the aforesaid polymerization process; and in another aspect, the invention is directed to the use of a method of polymerization to produce a liquid unsaturated polymer having a low molecular weight and a high content of centrally positioned double bonds.

The liquid unsaturated copolymers having a low-molecular weight and produced by the process of this invention are useful in various applications. For example, particular utility has been found for these copolymers as plasticizers for rubber, in the production of films, coatings, molding compounds, and the like, which are hardenable by cross-linking. These low molecular weight polymers are also useful as self-drying oils; thus, they can conveniently be used as additives to other drying oils. Further, the polymers produced according to this invention are useful as intermediate compounds inasmuch as their double bonds can be readily epoxidized, halogenated, hydrogenated, hydrohalogenated, and otherwise treated with, for example, halogenated hydrocarbons, to yield new and useful derivatives.

Various methods are described in the literature for polymerizing diolefins to form high-molecular weight polymers, including the use of a catalyst mixture of cobalt or nickel halogenide and aluminum sesquichloride to form solid rubbery polymers (German Patent No. 1,139,647). It is also conventional to form high molecular weight copolymers by the polymerization of butadiene and isoprene with the use of a catalyst mixture of alkyl aluminum chlorides and cobalt compounds, as disclosed in U.S. Patent No. 3,040,016, German published application No. 1,113,822, and British Patent No. 916,383.

However, in the production of low-molecular weight low-viscosity polymers of diolefins (with Ziegler catalysts), and particularly with copolymers thereof, polymerization regulators, such as butadiene-1,2, allene, acrylonitrile, azodicarboxylic acid dinitrile and azodicarboxylic acid esters, are generally unsatisfactory, the principal reason being that practically no yield of the desired low molecular weight polymer is obtained because of the inhibiting effect of the regulators on the catalysts.

To produce homopolymers of cis-1,4-polybutadiene having molecular weights of between 1,000 and 4,000 and viscosities below 500 centipoises (measured at 50° C. in a vapor pressure osmometer) according to German Patent No. 1,186,631, butadiene is polymerized with a mixed catalyst system comprising soluble nickel compounds and 0.005 to 0.05 mol, based on one mol of butadiene, of an alkyl aluminum sesquihalogenide, 0.25 mol of the nickel compound being used per mol of the aluminum containing compound.

In addition, rigorous control of this polymerization reaction is necessary: control of the polymerization reaction at a temperature of about 0° C., which requires refrigeration and the use of a reaction medium, such as benzene/hexane having a water content of less than 20 p.p.m. (nearly anhydrous conditions).

When an attempt was made to polymerize isoprene under the reaction conditions described in German Patent No. 1,186,631, it was found that this system was ineffective and no polymers of isoprene were obtained.

Example 7 (column 9) describes in detail the effect of the catalysts of this invention on isoprene.

It is desirable, however, to copolymerize a conjugated diolefin containing more than 4 carbon atoms with butadiene and thus it would be expected that it would be necessary to utilize reaction conditions which will initiate the polymerization of each monomer in the copolymer.

It is, therefore, a principal object of this invention to provide an improved method which facilitates the polymerization of conjugated diolefins having more than 4 carbon atoms with butadiene to form low molecular weight low-viscosity copolymers thereof.

Another object of this invention is to provide a catalyst system for use in the polymerization of conjugated diolefins having more than 4 carbon atoms and butadiene.

Still another object of the invention is to provide a novel low molecular weight liquid copolymer of butadiene and a conjugated diolefin.

Other and further objects and advantages of the invention will become apparent to one skilled in the art upon consideration of the process as hereinafter described.

It has been surprisingly found that low molecular weight low-viscosity copolymers of butadiene and conjugated diolefins containing more than 4 carbon atoms can be obtained if the polymerization thereof is performed in inert diluents with diluent-soluble mixed catalysts comprising catalytic quantities of nickel compounds and alkyl aluminum halides of the formula:

wherein

R represents hydrogen, alkyl, aryl, or alkylaryl groups having 1–12 carbon atoms.
X represents halogen, and
$n$ is 0.5–2.5, preferably 1 to 2.

The aluminum halide catalyst in the aforementioned general formula may comprise one or more of these aluminum compounds.

Exemplary of the preferred aluminum catalysts are, for example, alkyl aluminum dihalides and dialkyl aluminum halides wherein alkyl is methyl, ethyl, propyl, n-butyl, iso-butyl, n-octyl, dodecyl, and phenyl, and the halogen is chlorine, bromine, or iodine.

Even more preferred are mixtures of the above compounds, for example, ethyl aluminum sesquichloride, and also mixtures of trialkyl, triaryl, or trialkylaryl aluminum compounds, dialkyl, diaryl, or dialkylaryl aluminum monohalides, and alkyl, alkylaryl, or aryl aluminum dihalides or aluminum trihalides, provided both the average number of the halogen atoms per aluminum atom, and the number of the alkyl, aryl, or alkylaryl groups, is about 1.5.

In general, R is beneficially a hydrocarbon radical containing up to 12 carbon atoms, though a higher number of carbon atoms can be used.

Also suitable are aluminum hydrides, such as lithium and sodium aluminum hydride, in admixture with the above-mentioned alkyl aluminum halides. It is also desirable to employ aluminum hydride halides and the etherates thereof, for example, aluminum hydride chloride etherate, alone or in admixture with the above-named aluminum compounds.

The mixed catalysts suitable for the present process also contain nickel compounds which are soluble in the inert diluents used herein. It has been found that from 0.001 to 0.25 mol of the nickel compound should be used per mol of the aluminum halide catalyst, and the latter is used in amounts ranging from about 0.0001 to 0.5 mol per mol of the starting monomer to be polymerized. More particularly, it has been found preferable, in commercial operations, to employ from 0.01 to 0.25 mol of the nickel compound per mol of the aluminum compound, and the last-named compound preferably is used in amounts from about 0.001 to 0.05 mol per mol of the starting monomer.

It is also preferable that the nickel compounds used in this process are highly soluble in the inert diluents for the catalyst system. Organic nickel compounds particularly suitable in the present invention are the nickel salts of organic carboxylic acids, preferably containing 2 to 20 carbon atoms, such as nickel octoate, stearate, oleate, naphthenate, and also the complex compounds of nickel, such as nickel (II)-acetyl acetonate, nickel (II)-benzoyl acetonate, and bis-(cyclopentadienyl)-nickel.

With the mixed catalyst system described hereinbefore is used an inert diluent that is capable of dissolving the nickel catalysts.

Inert diluents which can be used are aliphatic, cycloaliphatic, and aromatic hydrocarbons having 4 to 12 carbon atoms, such as, butane, pentane, hexane, cyclohexane, isopropylcyclohexane, benzene fractions, benzene, toluene, xylene, as well as mixtures thereof. Likewise suitable are chlorinated hydrocarbons, such as, chlorobenzene and tetrachloroethylene, carbon tetrachloride, chloroform, and methylene chloride. These inert diluents are generally employed in amounts of from 0.1 to 20 parts by weight per part by weight of reacting monomer and preferably 0.5 to 5 parts by weight of diluent per part of monomer. However, in the usual commercial operation it has been found sufficient to use an amount of diluent of about equal to twice the amount by weight of the reacting monomer.

Utilizing the above described catalyst system, butadiene-(1,3) can be copolymerized with conjugated diolefins containing more than 4 carbon atoms which include, in addition to isoprene: 2-phenylbutadiene-(1,3), pentadiene-(1,3), 2-ethylbutadiene-(1,3), 3-methylpentadiene-(1,3), hexadiene-(1,3), 4-methylhexadiene-(1,3), heptadiene-(1,3), and similar olefins, as well as multiple olefins wherein two of the double bonds are conjugated, such as 2-methyl-6-methylene-octadiene-(2,7), and 2,6-dimethyl-octatriene-(1,5,7).

Advantageously, the polymerization process can be conducted at room temperature. However, the polymerization process can also be performed at higher or lower temperatures, in the range of −30° C. to +100° preferably +10 to +50° C. Normally, atmospheric pressure is maintained; but if desired, the process can also be carried out at slightly elevated pressures up to 10 atmospheres. It is especially desirable to conduct the polymerization at superatmospheric pressure when the reaction temperature exceeds 40° C.

Water and/or oxygen are desirably present during the polymerizing step in quantities which are negligible as compared to the amount of catalyst present. The water content of the diluent exerts a marked influence upon the molecular weight of the liquid polymers. In this connection, it was found that, with an increasing water concentration (in the tested region of from 1 to 250 p.p.m.), the molecular weight and thus the viscosity of the polymer are increased. The process is suitably conducted in an inert atmosphere, such as nitrogen, argon, or methane using dry solvents, as well as dry diolefin monomers.

When the process of the present invention is carried out batchwise, the catalyst components are introduced, one after the other, into the reaction vessel containing the diluent. It is particularly advantageous to first add the nickel compound and then to admix therewith the aluminum component in the presence of a small quantity of butadiene or another unsaturated carbon compound, such as, for example, isoprene, pentadiene-(1,3), dimethylbutadiene, cyclooctadiene, cyclodecatriene, acetylene, bicyclo-(1,2,2)-heptadiene-(2,5), or diacetylene. After the catalyst system is prepared, the monomers are slowly charged into the reaction chamber, either separately, or in a mixture in liquid form and/or in gaseous form. Normally, the butadiene is introduced in the gaseous state, and the diolefin which contains more than 4 carbon atoms is charged in the liquid phase. If both starting monomers are charged into the reactor before the catalyst and diluents, the polymerization is unsatisfactory or does not occur at all.

When the process of the invention is carried out in a continuous manner, the catalyst components are combined in a separate mixing vessel connected to the reactor, and the catalyst system is continuously charged to the reaction chamber as needed.

The molecular weight of the copolymer is regulated mainly by varying the aluminum/nickel ratio in the mixed catalyst, the average molecular weight increasing with an increasing aluminum/nickel ratio. Other process variables influencing the average molecular weight of the copolymer are the catalyst concentration, the butadiene/isoprene ratio, the polymerization temperature, and the diluent used. Thus, diluent mixtures of inert aliphatic and inert aromatic hydrocarbons, for example benzene/pentane, toluene/pentane, benzene/hexane mixtures, yield lower average molecular weight polymers than when pure diluents are used.

The purity of the monomers employed also influences the average molecular weight of the polymers; conversely, the type and amount of impurities in the monomer effect the average molecular weight of the copolymer. For example, if the monomers contain acetylenes or allenes, such as, butyne-(1), butyne-(2), propadiene, and butadiene-(1,2), decreasing average molecular weight copolymers are obtained with increasing concentrations of these impurities. Therefore, it is often desirable to add these impurities to the monomers to regulate the molecular weight. For this purpose, it is also possible to use compounds which normally are not present in the monomers, such as ketones, amines, or nitriles, such as, acrylonitrile, acetonitrile, as well as alkyl halides or alkenyl halides, such as, allyl chloride.

After the polymerization reaction is terminated, the reaction mass is worked up in a conventional manner, the mixed catalyst being inactivated by the addition of small amounts of Lewis bases, for example water, alcohol, ketones, amines, ethers, or mixtures thereof, and the diluent being removed by evaporation or steam distillation. Thereafter, the catalyst residues can be removed by washing the polymer either with water to which, if desired, inorganic or organic bases or acids are added and which is advantageously heated to above 50° C. or by washing with alcohols, such as methanol. The diluents, such as, water and alcohol which are retained on the polymers are removed therefrom by treatment under a nitrogen blanket at temperatures up to 100° C. and at subatmospheric pressures.

An alternative procedure for working up the reaction mixture consists in precipitating the low-molecular weight polymers with alcohol, for example, methanol, and simultaneously removing the catalyst by stirring. The specifically heavier liquid unsaturated polymer is separated and subsequently freed from adhering alcohol under vacuum at temperatures of up to approximately 100° C. The adhering diluents, the water, and the alcohol, are then advantageously removed under vacuum in a thin-film evaporator.

The thus-obtained low-molecular weight liquid copolymers exhibit, depending upon the reaction conditions employed in their production, average molecular weights of 500 to 30,000 (determined by the vapor pressure osmometer), and viscosities of 50 to 5,000 centipoises at 50° C.

(measured in the Hoeppler falling ball viscosimeter constructed according to Haake).

They contain more than 90% centrally positioned double bonds. At least 65% of the double bonds are of cis-1,4-structure. None of the butadiene-isoprene copolymers known in the art have a proportion of centrally positioned double bonds and a proportion of cis-configurations as high as the copolymers of the invention. Depending on their high percentage of centrally positioned double bonds and of cis-stereo-configurations, they have extraordinarily low viscosities, compared with butadiene-isoprene copolymers having the same molecular weights, as they are described, for example, in French Patent No. 1,376,404.

The low-molecular weight liquid copolymers produced according to the present process contain more than 90% centrally positioned double bonds. For example, in copolymers having an isoprene content of 35%, at least 95% of the repeating units contain centrally positioned double bonds. Since the iodine number of these copolymers amounts to at least 95% of the theoretically computed iodine number, and centrally positioned double bonds form epoxides far more rapidly and under milder conditions than vinyl or vinylidene double bonds, these copolymers can be readily epoxidized to high oxygen contents. The centrally positioned double bonds are of a predominantly cis-structure.

At least 65% of the double bonds in the copolymers are cis-1,4-structure, the proportion of trans-stereo-configuration being between 10 and 35%, the content of vinyl-double bonds <3%, and of vinylidene-double bonds <10%.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example 1*

A number of runs were made in which butadiene was catalytically copolymerized with a diolefin having more than 4 carbon atoms to form a low molecular weight liquid polymer. These runs were carried out by the following procedure:

1,000 ml. of benzene containing 25 p.p.m. of water was charged into a 2 liter reaction vessel which had previously been flushed with nitrogen to remove atmospheric oxygen and all traces of moisture. Thereafter, 2.47 g. (10 millimols) of nickel (II)-acetyl acetonate and 9.9 g. (80 millimols) of ethyl aluminum sesquichloride were added at room temperature and in the presence of traces of butadiene. Then, 324 g. (6 mols) of a polymerizable monomer containing 98.8 molar percent of butadiene and governing impurities of 0.01 molar percent butadiene-(1,2), 0.02 molar percent propadiene, 0.02 molar percent ethyl acetylene, 0.15 molar percent 1-isobutene, 0.01 molar percent trans-butene, and 0.01 molar percent cis-butene and maintained at 25° C. was continuously introduced as a gas to the reactor over a period of 4 hours with constant stirring. Simultaneous with the butadiene addition, 102 g. (1.5 mols) of a polymerizable monomer containing 99.9% isoprene and governing impurities of 0.1% by weight of trans- and cis-2-methylbutene-(2) are added dropwise. After the reactants are charged, stirring is continued for 1 hour whereupon the catalyst is decomposed by the addition of 10 ml. acetone thereto. The low-molecular weight polymer was precipitated from the solution with methanol.

The resulting oily polymer was separated and washed three times with 1 liter portions of methanol. The liquid copolymer is then heated to 40° C. under vacuum (15 mm. Hg) to remove adhering methanol. The yield of polymer and percent conversion was then determined.

There are obtained 340 g. (79.8% theoretical) of a liquid copolymer having a viscosity of 396 centipoises measured at 50° C., in a Hoeppler falling ball viscosimeter constructed according to Haake, an average molecular weight of 2,300 (vapor pressure osmometer), a density (50/4) of 0.9005, and a refractive index ($n_D^{20}$) of 1.5231. The iodine number is 449. According to the IR-analysis, the polymer contains 22% centrally positioned trans- and 63% centrally positioned cis-polybutadiene double bonds, 13% centerally positioned polyisoprene double bonds, less than 1% vinyl double bonds, and less than 1% vinylidene double bonds.

The foregoing run, designated as run 1, illustrates the method of producing the improved copolymer of this invention.

Several more runs designated as runs 2–6, inclusive, were thereafter conducted with the same reactants and catalyst components as employed in run 1. These latter tests, however, used various proportions of the aluminum and nickel containing catalysts thereby to illustrate the effect thereof on the yield, viscosity, and isoprene content (expressed in percent of centrally positioned double bonds in the polyisoprene). The results of these tests, tabulated in Table I, show that when the aluminum/nickel catalyst ratio is greater than 30:1, the molecular weight and viscosity of the resulting polymer increases above acceptable levels.

TABLE I

|  | Runs | | | | | |
|---|---|---|---|---|---|---|
|  | 1 | 2 | 3 | 4 | 5 | 6 |
| Ethyl aluminum sesquichloride in millimols | 80 | 60 | 40 | 60 | 60 | 60 |
| Al/Ni-ratio | 8:1 | 6:1 | 4:1 | 30:1 | 60:1 | 75:1 |
| Yield in percent | 79.8 | 73.9 | 70.4 | 69.5 | 64.8 | 62.2 |
| Average molecular weight (vapor pressure osmometer) | 2,300 | 2,100 | 1,800 | 4,100 | 4,900 | 5,500 |
| Viscosity, centipoises/50° C | 396 | 374 | 344 | 536 | 634 | 729 |
| Density (50/4) | 0.9005 | 0.8970 | 0.8957 | 0.9012 | 0.9025 | 0.9035 |
| Iodine number | 449 | 451.5 | 456 | 453 | 445 | 456 |
| Refractive index | 1.5231 | 1.5239 | 1.5240 | 1.5238 | 1.5249 | 1.5259 |
| Centrally Positioned Double Bonds in Percent: |  |  |  |  |  |  |
| Trans-polybutadiene | 22 | 20 | 32 | 16 | 14 | 11 |
| Cis-polybutadiene | 63 | 65 | 50 | 68 | 72 | 75 |
| Centrally positioned Polyisoprene | 13 | 13 | 16 | 14 | 12 | 11 |
| Vinyl | <1 | <1 | <1 | <1 | 1 | 2 |
| Vinylidene | <1 | <1 | <1 | <1 | <1 | <1 |

*Example 2*

A mixture of 750 ml. benzene and 250 ml. n-hexane containing 30 p.p.m. of water was charged into a 2 liter reaction vessel which had previously been flushed with nitrogen to remove atmospheric oxygen and all traces of moisture. Thereafter, 2.47 g. (10 millimols) of nickel (II)-acetyl acetonate and 7.42 g. (60 millimols) of ethyl aluminium sesquichloride were added at room temperature and in the presence of traces of butadiene. Then, 324 g. (6 mols) of gaseous butadiene and 102 g. (1.5 mols) of liquid isoprene, both having the composition as employed in Example 1, and maintained at 0° C. was continuously introduced into the reactor over a period of 4 hours with constant stirring. After the reactants are charged, stirring is continued for 1 hour whereupon the catalyst is then decomposed by the addition of 10 ml. acetone thereto. The low molecular weight polymer was precipitated from the solution with methanol.

The resulting oily polymer is separated and washed three times with 1 liter portions of methanol; the liquid copolymer then being heated to 40° C. under vacuum (15 mm. Hg) to remove adhering methanol. The yield of polymer and percent conversion was then determined.

There are obtained 320 g. (75.1% theoretical) of a liquid polymer having a viscosity of 273 centiposes measured at 50° C., in a Hoeppler falling ball viscosimeter constructed according to Haake, an average molecular weight of 2,300 (vapor pressure osmometer), a density (50/4) of 0.8934, and a refracttive index ($n_D^{20}$) of 1.5228.

In addition to the foregoing procedure designated as run 7, 3 more runs designated as runs 8 to 10, inclusive, were thereafter conducted with the same reactants and catalyst components as employed in run 7. In these latter tests, however, the ratio of butadiene/isoprene was varied to illustrate the effect thereof on the yield, viscosity, and isoprene content of the resuling copolymer. The results of these tests, tabulated in Table II, show that the molecular weight of the copolymer increased as the ratio of butadiene to isoprene decreased.

structed according to Haake, an average molecular weight of 3,800 (vapor pressure osmometer), a density (50/4) of 0.8928, and a refractive index ($n_D^{20}$) of 1.5232.

The iodine number is 451 (99% theoretical). According to the IR-analysis, the polymer contains 13% centrally positioned trans- and 73% centrally positioned cis-polybutadiene double bonds, 11% centrally positioned polyisoprene double bonds, less than 1% vinylidene, and 2% vinyl double bonds.

*Example 4*

1,000 ml. of benzene containing 38 p.p.m. of water was charged into a 2 liter reaction vessel which had been previously flushed with nitrogen to remove atmospheric oxygen and moisture. Thereafter, 2.47 g. (10 millimols) of nickel (II)-acetyl acetonate and 7.62 g. (60 millimols) of ethyl aluminum dichloride were added at room temperature in the presence of traces of butadiene. 324 g. (6 mols) of gaseous butadiene and 102 g. (1.5 mols) of liquid isoprene, both of the same composition as used in Example 1, and maintained at 25–30° C. was continuously introduced into the reactor over a period of 4 hours. After the catalyst and reactants had been charged, stirring was continued for 1 hour whereupon the catalyst was decomposed and the polymer precipitated, washed, and dried as in Example 1.

There are obtained 340 g. (79.8% theoretical) of a liquid polymer having a viscosity of 362 centipoises measured at 50° C., in a Hoeppler falling ball viscosimeter constructed according to Haake, and a refractive index of 1.5250.

TABLE II

| | Runs | | | |
|---|---|---|---|---|
| | 7 | 8 | 9 | 10 |
| Butadiene, mols | 6 | 5 | 4 | 2 |
| Isoprene, mols | 1.5 | 3 | 4 | 6 |
| Yield, percent | 75.1 | 72 | 57.4 | 27.3 |
| Molecular weight (vapor pressure osmometer) | 2,300 | 3,200 | 3,800 | 4,600 |
| Viscosity centiposes/50° C | 273 | 458 | 659 | 1575 |
| Density (50/4) | 0.8934 | 0.8938 | 0.8915 | 0.8939 |
| Iodine number | 448 | 444 | 434 | 421 |
| Refractive index $n_D^{20}$ | 1.5228 | 1.5218 | 1.5215 | 1.5214 |
| Double bonds in percent: | | | | |
| Trans-polybutadiene | 15 | 15 | 13 | 12 |
| Cis-polybutadiene | 72 | 65 | 57 | 40 |
| Centrally positioned polyisoprene | 11 | 18 | 28 | 42 |
| Vinyl | <1 | 1 | <1 | <1 |
| Vinylidene | <1 | <1 | 1 | 5 |

*Example 3*

1,000 ml. benzene containing 35 p.p.m. of water was charged into a 2 liter reaction vessel which had previously been flushed with nitrogen to remove atmospheric oxygen and moisture. Thereafter, 7.23 g. (60 millimols) of diethyl aluminum chloride and 3.45 g. (10 millimols) of nickel (II)-octoate were added at room temperature and in the presence of trace amounts of butadiene. Subsequently 324 g. (6 mols) of gaseous butadiene and 102 g. (1.5 mols) of liquid isoprene, both having the composition as employed in Example 1, and maintained at 25 to 30° C. was continuously introduced into the reactor over a period of 4 hours. After the reactants are charged, stirring is continued for 1 hour whereupon the catalyst is decomposed by the addition of 10 ml. acetone thereto. The low molecular weight polymer was precipitated from the solution with methanol.

The resulting polymer is separated and washed three times with 1 liter portions of methanol. The liquid copolymer is then heated to 40° C. under vacuum (15 mm. Hg) to remove adhering methanol therefrom.

There are obtained 313 g. (73.5% theoretical) of a liquid polymer having a viscosity of 729 centiposies measured at 50° C. in a Hoeppler falling ball viscosimeter con- The iodine number is 453 (99% theoretical). According to the IR-analysis, the polymer contains 21% centrally positioned trans- and 68% centrally positioned cis-polybutadiene double bonds, 9% centrally positioned polyisoprene double bonds, less than 1% vinylidene, and less than 1% vinyl double bonds.

*Example 5*

1,000 ml. toluene containing 27 p.p.m. of water was charged into a 2 liter reaction vessel which had been previously flushed with nitrogen to remove atmospheric oxygen and moisture. 2.47 g. (10 millimols) of nickel (II)-acetyl acetonate and 7.42 g. (60 millimols) of ethyl aluminum sesquichloride were then added at room temperature in the presence of traces of butadiene. Thereafter, 324 g. (6 mols) of a polymerizable monomer containing 99.0 molar percent butadiene and governing impurities of 0.05 molar percent butadiene-(1,2), 0.02 molar percent propadiene, 0.01 molar percent ethyl acetylene, 0.61 molar percent 1-/isobutene, 0.08 molar percent trans-butene and 0.08 molar percent cis-butene, 0.1 molar percent n-butane, 0.01 molar percent isobutane, and 0.01 molar percent propylene, are continuously added in the gaseous phase with stirring while simultaneously, 51 g. (0.72 mol) of a polymerizable monomer containing, according to the gas-chromatographical analysis, 69% by weight of trans-1,3-pentadiene, 21% by weight of cis-1,3-pentadiene, 9.9% by weight of cyclopentene, and 0.4% by weight of isopentene, is added dropwise; both monomers being added at 25–30° C. over a period of 2½ hours. After the monomers are charged, stirring is continued for 1 hour whereupon the catalyst is decomposed, the polymer is precipitated, washed, and dried as in Example 1.

There are obtained 295 g. (78.9% theoretical) of a liquid copolymer having a viscosity of 420 centipoises measured at 50° C. in a Hoeppler falling ball viscosimeter constructed according to Haake. The iodine number is 446 (98% theoretical). According to the IR-analysis, the polymer contains 19% centrally positioned trans- and 72% centrally positioned cis-double bonds, less than 1% vinyl double bonds, and 8% polymerized pentadiene-(1,3).

The refractive index ($n_D^{20}$) is 1.5221, and the density is ($d$ 50/4) 0.8878. The average molecular weight of the copolymer (determined in the vapor pressure osmometer) is 2,390.

*Example 6*

Under the same reaction conditions employed in Example 5, 324 g. (6 mols) butadiene and 102 g. (1.5 mols) pentadiene, both of the composition used in Example 5, are copolymerized over a period of 2½ hours and at 25 to 30° C. in the reaction medium containing 7.42 g. (60 millimols) ethyl aluminum sesquichloride and 2.47 g. (10 millimols) nickel (II)-acetyl acetonate as the catalyst. After the reactants are charged, stirring is continued for 1 hour whereupon the catalyst is decomposed, the polymer is precipitated, washed, and dried, as in Example 5.

There are obtained 270 g. (63.3% theoretical) of a liquid copolymer having a viscosity of 650 centipoises measured at 50° C. in a Hoeppler falling ball viscosimeter constructed according to Haake. The refractive index ($n_D^{20}$) is 1.5198, and the density ($d$ 50/4) is 0.8829. The molecular weight (measured in the vapor pressure osmometer) is 3,540.

The iodine number is 441 (98% theoretical). According to the IR-analysis, the polymer contains 14% centrally positioned trans- and 67% centrally positioned cis-double bonds, 1% vinyl double bonds, and 18% polymerized pentadiene-(1,3).

*Example 7*

A mixture of 750 ml. benzene and 250 ml. n-hexane, containing 22 p.p.m. of water, was charged into a 2 liter reaction vessel which had previously been flushed with nitrogen to remove atmospheric oxygen and moisture. 7.42 g. (60 millimoles) of ethyl aluminum sesquichloride and 2.47 g. (10 millimoles) of nickel (II)-acetyl acetonate were then added at room temperature in the presence of traces of isoprene. Thereafter 408 g. (6 moles) isoprene, having the composition as employed in Example 1, and maintained at 15° C., is continuously introduced into the reactor over a period of 4 hours. After the reactants are charged, stirring is continued for one hour whereupon the catalyst is decomposed by the addition of 10 ml. acetone thereto.

The low-molecular weight polymer was precipitated from the solution with methanol.

There are obtained 22 g. (5.3% of the theory) of a polyisoprene having an average molecular weight of 40,300 (vapor pressure osmometer). According to the IR-analysis, the polymer contains 58% centrally positioned cis- and 16% centrally positioned trans- and 26% vinyl-double bonds. The iodine number is 373.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. Process for the production of low-molecular weight liquid copolymers having a molecular weight of 500 to 30,000 and a viscosity, measured at 50° C. of from 50 to 5,000 centipoises, from monomers of butadiene and conjugated diolefins, the process comprising: copolymerizing 0.1 to 3 mols of conjugated diolefin containing more than 4 carbon atoms with one mole of butadiene in an inert diluent containing a mixed catalyst therein comprising catalytic amounts of a diluent-soluble nickel compound and an aluminum halide of the formula

$$R_nAlX_{(3-n)}$$

wherein

R represent hydrogen, alkyl, aryl, or alkylaryl residues of 1 to 12 carbon atoms
X represents halogen, and
$n$ is a number of 0.5 to 2.5

2. Process as defined by claim 1 wherein the polymerization reaction is conducted at a temperature of from −30 to +100° C. under a pressure of from 1 to 10 atmospheres.

3. Process as defined by claim 1 wherein the inert diluent is present in an amount of from 0.1 to 20 parts by weight per part of the reacting monomers.

4. Process as defined by claim 1 wherein said aluminum halide is present in an amount of from 0.0001 to 0.5 mol per mol of the reacting monomers and the nickel compound is present in an amount of from 0.001 to 0.25 mol per mol of the aluminum halide.

5. Process as defined by claim 1 wherein the inert diluent is a hydrocarbon of 4 to 12 carbon atoms.

6. Process as defined by claim 1 wherein said conjugated diolefin is selected from the group consisting of isoprene, pentadiene-(1,3), 2 - phenylbutadiene - (1,3), hexadiene-(1,3), and heptadiene-(1,3).

7. Process as defined by claim 1 wherein the nickel compound is an organic complex compound of nickel or a nickel salt of an organic carboxylic acid selected from the group consisting of nickel (II)-benzoyl acetonate, nickel (II)-acetyl acetonate, nickel (II)-octoate, nickel (II)-naphthenate, nickel (II)-stearate, and nickel (II)-oleate.

8. Process as defined by claim 1 wherein the aluminum halide is selected from the group consisting of ethyl aluminum sesquichloride, methyl aluminum sesquichloride, ethyl aluminum dichloride, methyl aluminum dichloride, diethyl aluminum chloride, and dimethyl aluminum chloride.

9. A copolymer of butadiene and a conjugated diolefin having more than 4 carbon atoms, said copolymer having a molecular weight of 500 to 30,000, a viscosity measured at 50° C., of 50 to 5,000 centipoises, and more than 90% of centrally positioned double bonds.

10. A copolymer as defined by claim 9 wherein at least 65% of the double bonds are cis-1,4-structure; about 10–35% are trans; the content of vinyl double bonds is less than 3%; and the content of vinylidene double bonds is less than 10%.

References Cited

FOREIGN PATENTS 1,376,404   9/1964   France.

DELBERT E. GANTZ, *Primary Examiner.*

G. E. SCHMITKONS, *Assistant Examiner.*